United States Patent [19]
Van Sistine et al.

[11] Patent Number: 5,537,019
[45] Date of Patent: Jul. 16, 1996

[54] SWITCHED RELUCTANCE MOTOR PROVIDING ROTOR POSITION DETECTION AT HIGH SPEEDS WITHOUT A SEPARATE ROTOR SHAFT POSITION SENSOR

[75] Inventors: Thomas G. Van Sistine; Ronald P. Bartos, both of Menomonee Falls; William L. Mehlhorn, Greenfield; Timothy H. Houle, Wauwatosa, all of Wis.

[73] Assignee: A. O. Smith Corporation, Milwaukee, Wis.

[21] Appl. No.: 403,990

[22] Filed: Mar. 14, 1995

[51] Int. Cl.⁶ .................................................. H02P 7/00
[52] U.S. Cl. .............................................. 318/701; 318/254
[58] Field of Search .................................. 318/701, 254, 318/138, 439, 696, 685

[56] References Cited

U.S. PATENT DOCUMENTS

| | | | |
|---|---|---|---|
| 3,909,688 | 9/1975 | Blaschke et al. | 318/227 |
| 4,253,053 | 2/1981 | Ray et al. | 318/701 |
| 4,520,302 | 5/1985 | Hill et al. | 318/696 |
| 4,670,698 | 6/1987 | Fulton et al. | 318/802 |
| 4,739,240 | 4/1988 | MacMinn et al. | 318/696 |
| 4,746,850 | 5/1988 | Abbondanti | 318/778 |
| 4,772,839 | 9/1988 | MacMinn et al. | 318/696 |
| 4,876,491 | 10/1989 | Squires et al. | 318/138 |
| 4,992,710 | 2/1991 | Cassat | 318/254 |
| 5,001,405 | 3/1991 | Cassat | 318/254 |
| 5,015,927 | 5/1991 | Reichard | 318/254 X |
| 5,015,939 | 5/1991 | Konecny | 318/701 |
| 5,017,845 | 5/1991 | Carobolante et al. | 318/138 |
| 5,028,852 | 7/1991 | Dunfield | 318/254 |
| 5,043,643 | 8/1991 | Hedlund et al. | 318/254 |
| 5,051,680 | 9/1991 | Belanger | 318/701 |
| 5,117,165 | 5/1992 | Cassat et al. | 318/254 |
| 5,256,923 | 10/1993 | Bartos et al. | 318/701 X |
| 5,256,949 | 10/1993 | Reichard et al. | 318/254 |
| 5,410,235 | 4/1995 | Ehsani | 318/701 |
| 5,420,492 | 5/1995 | Sood et al. | 318/254 X |
| 5,440,218 | 8/1995 | Oldenkamp | 318/701 |

*Primary Examiner*—Jonathan Wysocki
*Attorney, Agent, or Firm*—James E. Lowe, Jr.; Thomas R. Miller

[57] ABSTRACT

A switched reluctance motor includes a rotor mounted for rotation about an axis, and having a plurality of rotor poles, and a stator surrounding the rotor and including first, second and third stator phases. The motor also includes energizing means for sequentially energizing the stator phases with an energy source to cause rotation of the rotor, based on rotor position information, the energizing means causing one phase to be energized and then deenergized to near a zero current level prior to a point where the rotor pole breaks away from the stator pole. The energizing means further includes limited current turn on means connected to switch operating means for operating a switch on the one phase to permit flow of limited current through the one phase after it reaches a near zero current level but before the break away point. The motor further includes circuit means connected to the one phase for permitting the limited current to circulate through the one phase; and current sensing means for sensing the amount of current in the one phase and for determining when the current exceeds a predetermined regenerative current threshold at about the break away point, the energizing means being connected to the current sensing means to use this excess regenerative current information at about the break away point for rotor position information.

11 Claims, 3 Drawing Sheets

SWITCHED RELUCTANCE MOTOR PROVIDING ROTOR POSITION DETECTION AT HIGH SPEEDS WITHOUT A SEPARATE ROTOR SHAFT POSITION SENSOR

BACKGROUND OF THE INVENTION

The invention relates to switched reluctance ("SR") motors and, more particularly, to an apparatus for determining rotor position, without the use of a separate rotor shaft position sensor, for controlling when to commutate each phase of an SR motor for a desired speed at a given load. SR motors have multiple poles on both the stator and the rotor. There are windings or coils on the stator poles. Each pair of windings on diametrically opposite stator poles is connected in series to form an electrically independent phase of the SR motor. There are no windings or magnets on the rotor. However, the rotor is made up of magnetically permeable material such as, for example, a ferrous alloy.

In order to commutate an SR motor at high speed, it is first necessary to determine the position of the rotor with respect to the stator. The position of the rotor with respect to the stator establishes when the next phase should be energized. If the position of the rotor is not correctly determined, incorrect energization of the stator phases will result in inefficient operation of the motor or reduce the peak operating speed of the motor. However, conventional rotor shaft sensors for determining rotor position are bulky, unreliable and expensive.

One attempt at determining the position of the rotor with respect to the stator revolved around providing a phase current pathway to allow the phase current in the motor winding to continue to recirculate after that particular phase was energized. This current is called regen or regenerated current and the recirculation of regenerated current in the phase winding is known as free wheeling. Were it not for energy losses in the circuit, regenerated current or regen would continue to flow in the winding indefinitely.

Regen detection may be used to provide an indication of rotor pole position. When the voltage in the phase is constant, as the rotor pole moves away from the stator pole, the inductance in the stator phase winding decreases, thereby causing the regenerated current to increase in accordance with the equation:

$$V = L \, (dI/dT)$$

where V=voltage, L=inductance and (dI/dT) is the change in current with respect to time. This change in phase inductance produces a distinct bell-shaped regenerated current waveform (shown in FIG. 3).

By looking for the upturn in the regenerated current waveform at or shortly after alignment of the rotor pole with the stator phase winding, the exact position of the rotor can be determined. However, this technique generally works only for very low speed motors because the regenerated current remains in the phase winding after the rotor pole has passed the alignment position with the stator pole The existence of the regenerated current in the phase winding after alignment with the rotor pole produces braking action and torque ripple and thereby limits the practical speed range of the motor.

SUMMARY OF THE INVENTION

Known techniques for detecting the regenerated current in a phase winding in order to establish rotor position required a relatively large amount of current in the phase winding at the time of alignment of the phase winding with the rotor pole. This large amount of current was considered necessary to produce a sharper rise in the regenerated current waveform (shown generally in FIG. 3) immediately after alignment. The sharp rise in the waveform was used to detect alignment and initiate subsequent commutation of the SR motor. However, this created the problem of how to eliminate the regenerated current in the phase winding to prevent braking and torque ripple, and to prevent limitation of the practical speed range of the motor.

In general terms, the invention provides energizing means for sequentially energizing the stator phases with an energy source to cause rotation of the rotor, based on rotor position information, the energizing means causing one phase to be energized and then deenergized to near a zero current level prior to a point where the rotor pole breaks away from the stator pole. The energizing means further includes limited current turn on means connected to switch operating means for operating a switch on the one phase to permit flow of limited current through the one phase after it reaches a near zero current level but before the break away point. The motor further includes circuit means connected to the one phase for permitting the limited current to circulate through the one phase; and current sensing means for sensing the amount of current in the one phase and for determining when the current exceeds a predetermined regenerative current threshold at about the break away point, the energizing means being connected to the current sensing means to use this excess regenerative current information at about the break away point for rotor position information.

The circuit of the invention employs a microprocessor and support circuitry in combination with a field programmable gate array. The use of a gate array in combination with a microprocessor reduces the number of components necessary to practice the invention and reduces the space requirements of the circuit.

Specifically, the invention provides a circuit that shuts off the phase current immediately before, during and after alignment of the rotor pole with the phase winding. This shut off period is of sufficient length so as to insure the phase current is dissipated by energy losses and reaches a near zero current level. At approximately 15° after alignment of the rotor pole with the phase winding, a regenerative current path is provided and a current is generated in that path and is limited (through the use of a chopping transistor) to a small amount. As the regenerated current is monitored, at approximately 30° past alignment, the increasing current exceeds phase energy losses, so the current is no longer controlled by the chopping action of the transistor. The regenerated current increases rapidly at the time the rotor face breaks away from the stator face, allowing for accurate rotor position detection. When the regenerated current at the break away point reaches a threshold level which is approximately 100% above the chopping current limit, the transistor in the regenerated current path is turned off, as well as the chopping transistor. At the break away point, an angle counter is synchronized with this position information to get current rotor position information to permit commutation for the desired speed at a motor load. Because the regenerated current level was extremely low to begin with, and because the rotor is nearing the end of decreasing inductance, the remaining regenerated current in the phase winding quickly goes to zero. This results in less braking torque and torque ripple, and increases the practical speed range of the motor.

Other features and advantages of the invention will become apparent to those skilled in the art upon review of the following detailed description, claims and drawings.

DESCRIPTION OF THE DRAWINGS

FIG. 5 is a schematic diagram of the connection of the three stator phases to the energy source.

Figure 2:
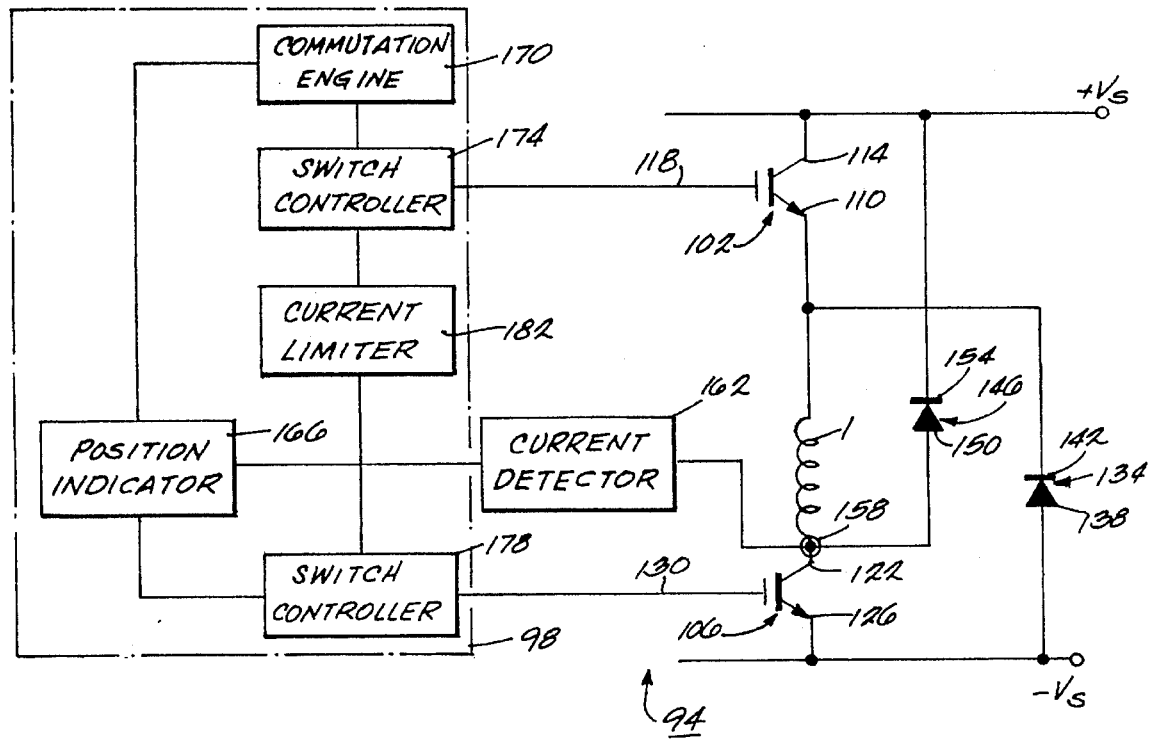
FIG. 2 is a schematic diagram of the electronic circuit for energizing the switched reluctance motor.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
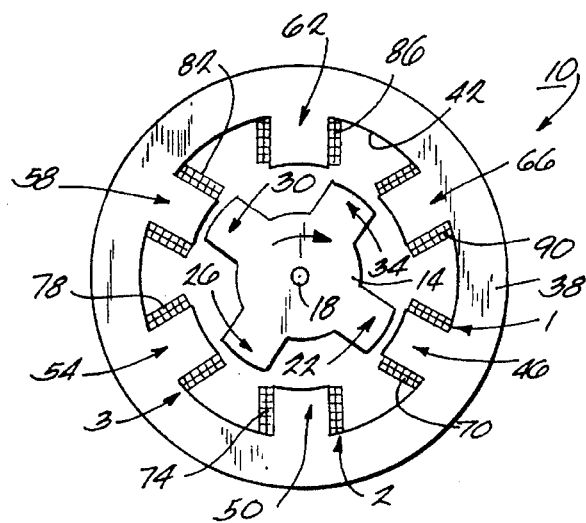
FIG. 1 is a schematic view of a switched reluctance motor showing, in cross-section, the stator and the rotor of the switched reluctance motor.

Shown in FIG. 1 of the drawings is a schematic view of a switched reluctance motor 10. The switched reluctance motor 10 includes a rotor 14 mounted for rotation about a hub having a central axis 18. The rotor 14 includes four rotor poles 22, 26, 30, and 34. The rotor poles 22, 26, 30, and 34 are evenly spaced about the axis 18 and extend radially outward from the rotor 14 relative to the axis 18.

The motor 10 also includes a stator 38 surrounding the rotor 14. The stator 38 has an inner surface 42 and six stator poles 46, 50, 54, 58, 62 and 66 extending from the inner surface 42 inwardly toward the rotor axis 18. The stator poles 46, 50, 54, 58, 62 and 66 are evenly spaced about the inner surface 42 of the stator 38. Because, in the preferred embodiment, the motor 10 includes six stator poles and four rotor poles, the switched reluctance motor 10 shown in FIG. 1 is referred to as 6/4 (six stator pole to four rotor pole ratio) switched reluctance motor. While this description will refer to the operation of the invention in terms of a 6/4 SR motor, it should be understood that any switched reluctance motor having any number of stator poles and rotor poles can be controlled with the circuit disclosed herein.

The SR motor 10 also includes windings or coils 70, 74, 78, 82, 86 and 90 on the stator poles 46, 50, 54, 58, 62 and 66, respectively. The windings 70, 74, 78, 82, 86 and 90 on diametrically opposite stator poles 46, 50, 54, 58, 62 and 66 are connected in series to form three electrically independent phases 1, 2, and 3 of the SR motor 10. As shown in FIG. 1, the windings 70 and 82 on stator poles 46 and 58, respectively, form pole pairs which together form Phase 1, the windings 74 and 86 on stator poles 50 and 62, respectively, form pole pairs which together form Phase 2, and the windings 78 and 90 on stator poles 54 and 66, respectively, form pole pairs which together form Phase 3. Because the rotor 14 is made of ferromagnetic material, energizing a particular phase of the motor 10 results in the formation of a magnetic attraction between the windings on the stator pole pairs comprising the energized phase and the rotor poles closest to the stator poles of the energized phase. By energizing the phases in a particular manner, the rotational direction and speed of the rotor 14 can be precisely controlled.

Shown in FIG. 2 of the drawings is a schematic diagram of an electronic circuit 94 for energizing the SR motor 10 at speeds, in this embodiment, from approximately 1,000 to 7,500 rotations per minute. The circuit 94 includes a field programmable gate array 98 and conventional support circuitry (not shown) for the gate array 98. The gate array 98 is connected to the motor 10, which is shown schematically in FIG. 2 as the phase winding 1. Preferably, a microprocessor (not shown) and conventional support circuitry (not shown) are used in combination with the gate array to control the motor 10 during starting and low speed operation. While any appropriate microprocessor could be used, the motor 10 uses microprocessor DSP56001RC33 manufactured by Motorola, Inc. The microprocessor is not used to energize the motor 10 at high speeds and accordingly it will not be described in great detail. An apparatus for starting the motor 10 is shown and described in United States Patent Application titled "APPARATUS FOR STARTING A SWITCHED RELUCTANCE MOTOR", which was filed on Mar. 14, 1995 as Ser. No. 08/403,990 and is incorporated herein by reference. Additionally, an apparatus for operating the motor 10 at low speeds is shown and described in United States Patent Application titled "APPARATUS FOR ENERGIZING A SWITCHED RELUCTANCE MOTOR AT LOW SPEEDS", which was filed on Mar. 14, 1995 as Ser. No. 08/404,385 and is incorporated herein by reference. This apparatus comprises first means using sensed current for determining rotor position at low motor speeds.

The circuit 94 includes switch means for electrically connecting and disconnecting the phase winding 1 to an energy source. While any electrically controllable switches are appropriate (such as, for example, transistors of any type), the switch means shown in FIG. 2 is a pair of insulated gate bipolar transistors (IGBTs), 102 and 106, that operate as power switches for energizing the phase winding 1. The transistor 102 includes an emitter 110 connected to one end of the phase winding 1, a collector 114 connected to a positive supply voltage (+Vs), and a gate 118. The transistor 106 includes a collector 122 connected to the other end of the phase winding 1, an emitter 126 connected to a negative supply voltage (−Vs), and a gate 130. This portion of the circuit 94 is duplicated as many times as there are phases on the particular SR motor. For the motor 10 shown in FIG. 1 of the drawings, there are three phases and accordingly, this portion of the circuit 94 would be repeated three times, i.e., there are three phase windings connected between the supply voltages via three pairs of power transistors. Only one of these circuit portions is shown and described in detail.

Figure 5A:
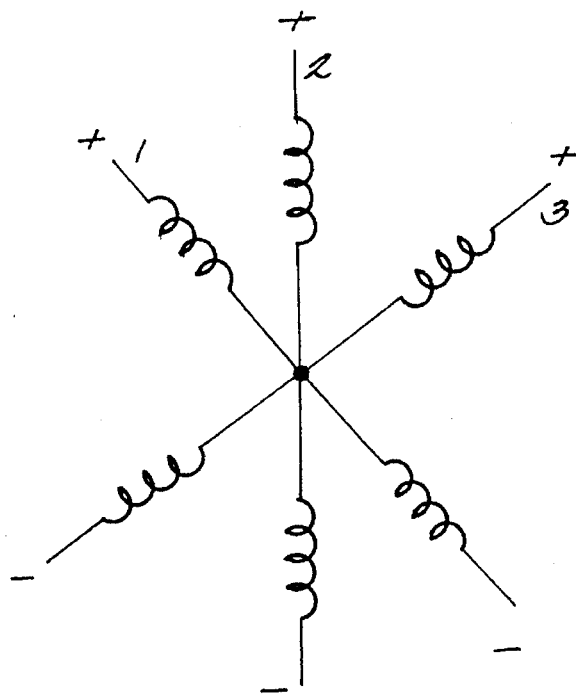
In FIG. 5(a), each of the three phases is connected at adjacent ends to a positive supply voltage.
Figure 5B:
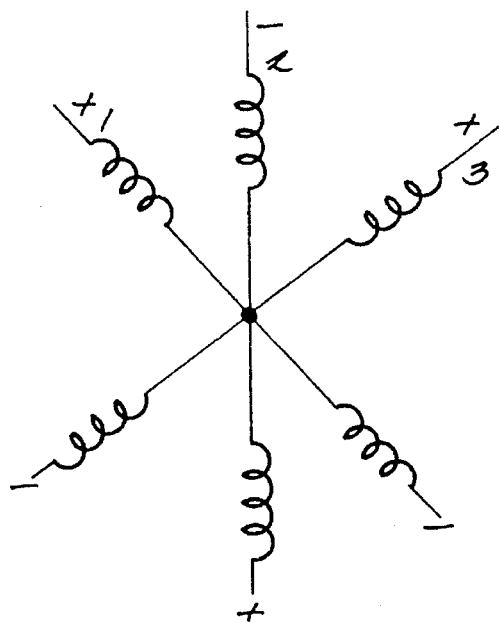
In FIG. 5(b), each of the three phases is alternately connected at adjacent ends to a positive supply voltage and then a negative supply voltage.

In one embodiment, as illustrated schematically in FIG. 5(a), each of the three phases are connected at one end in succession to the positive supply voltage, with the other end connected to the negative supply voltage. More particularly, one end of each phase winding is connected to the emitter 110 of transistor 102 in its respective circuit, and the other end of each phase winding is connected to the collector 122 of transistor 106 of its respective circuit. For smaller motor sizes, this traditional way of connecting the phase windings works fine. For large motors however, like an 88-frame motor, energy in adjacent energized windings has been found to create unwanted magnetic effects in the unenergized winding. This makes effective low current detection difficult. Accordingly, the preferred embodiment, especially for larger motors, has adjacent phases alternately connected between the positive supply voltage and the negative supply voltage of the energy source. More particularly, as illustrated schematically in FIG. 5(b), one end of each of phase windings 1 and 3 is connected to the emitter 110 of transistor 102 in its respective circuit, and the other end of each phase winding is connected to the collector 122 of transistor 106 of its respective circuit. Phase winding 2, on the other hand, has its end between the positive supply voltage connections of phases 1 and 3 connected to the negative supply voltage. More particularly, the end between the emitter 110 of transistor 102 in the respective circuits of phases 1 and 3 is connected to the collector 122 of transistor 106 of its respective circuit, and the other end of the phase winding is connected to the emitter 110 of transistor 102 of its respective circuit. This phase winding connection scheme has been found to significantly reduce magnetic effects on adjacent windings in larger motors.

The circuit 94 also includes circuit means for providing a current flow path for regenerated current in the phase winding 1. The current flow path includes a first diode 134 having an anode 138 and a cathode 142. The cathode 142 is connected between the emitter 110 of transistor 106 and the phase winding 1, and the anode 138 is connected to the negative supply voltage (−Vs). The circuit means also includes diode 146 having an anode 150 and a cathode 154. The anode 150 of diode 146 is connected between the phase winding 1 and the collector 122 of transistor 106 and the cathode 154 is connected to the positive supply voltage (+Vs).

The circuit 94 also includes energizing means, including switch operation means connected to the switches 102 and 106, for selectively energizing and deenergizing the phases in succession, based on rotor position information, to generate a torque on the rotor and thereby rotate the rotor, the energizing means causing a phase to be energized and then deenergized to near a zero current level prior to a break away point, as described in more detail later. More particularly, the energizing means is second means using sensed current for determining rotor position at higher motor speeds, and includes run means connected to the first and second means and the switch operating means for switching on a selected one of the switches to rotate the rotor. More particularly, the run means comprises a commutation engine 170. The switch operating means includes a first switch controller 174 which is connected to the commutation engine 170 and to the base 118 of the transistor 102. The switch controller 174 receives switch control signals from the commutation engine 170 and generates switch operating signals for operating the transistor 102. The energizing means also includes a second switch controller 178 connected to the base of transistor 106. The switch controller 178 receives switch control signals from the commutation engine 170 and generates switch operating signals for the power transistor 106. The circuit 94 also includes a current limiter 182 connected to the switch controller 174 and to the switch controller 178.

The energizing means also includes limited current turn on means connected to the switch operating means for operating the switch on the one phase to permit flow of limited current through the one phase after it reaches the near zero current level but before the break away point.

The circuit 94 also includes current sensing means for measuring the amount of current flowing through the phase winding 1 at a given moment. Though any means for measuring the phase current is appropriate, the means of the preferred embodiment includes a current sensor 158 which is mounted adjacent the phase current pathway. In the preferred embodiment, a current sensor sold by the LEM Company is used. The current sensor outputs a voltage which is proportional to the current.

The current sensing means also determines when the current exceeds a predetermined regenerative current threshold at about the break away point, the energizing means being connected to the current sensing means to use this excess regenerative current information at about the break away point for rotor position information. More particularly, the current sensor output is connected to a current detector 162 (a comparator). A reference voltage is also connected to the comparator so that when the current sensor signal exceeds the reference signal, the comparator updates a position indicator 166 (angle counter) which tells the commutation engine where the rotor is. Depending on the desired speed of the motor and the motor load, the commutation engine will then energize the next phase at the appropriate time, as is conventional in the art. In other embodiments, the current sensor signal could be read by an analog to digital converter, and then compared in digital logic or in the microprocessor.

In operation, when both transistors 102 and 106 are switched on, the phase winding 1 connected to the transistors 102 and 106 is energized with a run current, i.e., current of sufficient power to generate a magnetic field resulting in an attractive force between the stator poles comprising the energized phase winding and the nearest rotor poles. This attraction adds momentum to the rotor 14 which is already rotating.

Figure 4:
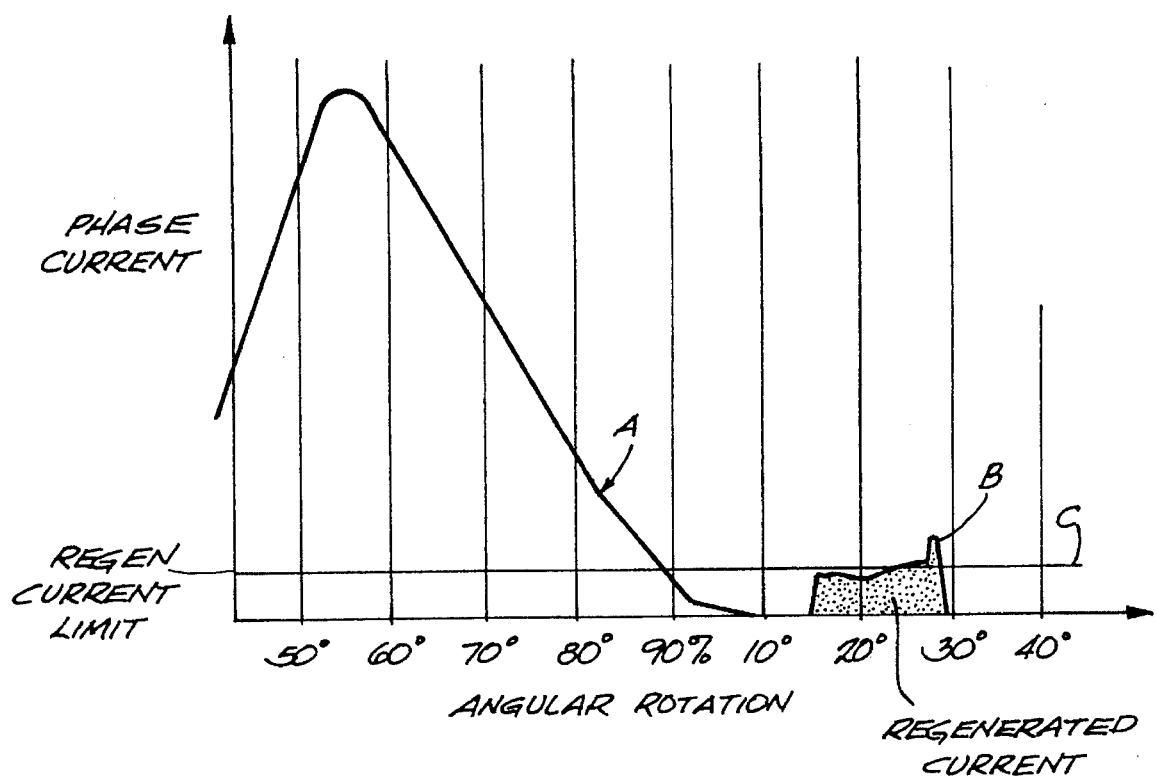
FIG. 4 is a graphic chart illustrating the phase current in a given phase winding and the regenerated current generated in that phase winding by the circuit of the invention.

FIG. 4 illustrates the current waveform in the phase winding 1 before, during, and after alignment of the rotor pole with the stator poles. Immediately prior to alignment of a pair of rotor poles with a particular pair of stator poles, transistors 102 and 106 are turned off (see point A in FIG. 4) eliminating the flow of phase current in the phase winding 1. At approximately 15° after alignment of the rotor poles with the stator poles, the transistors 102 and 106 are turned on and the transistor 102 is repeatedly switched off and on (i.e., chopped) to generate in the phase winding 1 a controlled amount of current. In the preferred embodiment, this controlled amount of current is about 4% of the run current. As the chopping transistor 102 operates, the current in the phase winding 1 is monitored and compared against the reference signal at the current detector 162.

Figure 3:
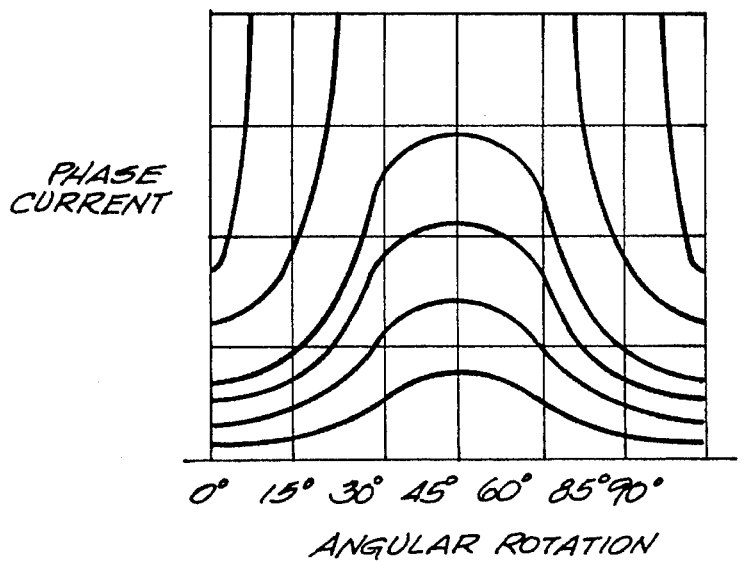
FIG. 3 is a graphic chart illustrating the typical response of the regenerated phase current as the rotor pole rotates past alignment with the phase.

At this point the regenerated current is flowing in a continuous regenerated current loop through the phase winding 1, the transistor 106 and the diode 134. As the rotor pole moves further past alignment with the stator pole, the regenerated current in the phase winding 1 increases as a result of the decreasing inductance in the phase winding 1 (see FIGS. 3 and 4). As the rotor continues to rotate, the amount of the rotor pole face opposite the stator pole face decreases until where the rotor pole face eventually moves away from the stator pole face. The point where this occurs is referred to as the break away point. More particularly, referring to FIG. 1, rotor pole 34, which is moving clockwise, is just past the point where it has broken away from the stator pole 62. At the break away point, the inductance in the phase winding decreases dramatically because of the sharp increase in the magnetic reluctance through the stator and rotor poles. As a result, the regenerated current increases sharply. The regenerated current is monitored by the current detector 162 and, when the regenerated current reaches a reference point (reference point B in FIG. 4) that is about 100% above a predetermined regenerated current limit (line C in FIG. 4), the transistors 102 and 106 are turned off. The current detector 162 also updates the position indicator 166 so the commutation engine 170 can, at the appropriate time, cause switch controllers 174 and 178 to energization the next phase (phase 3) of the SR motor 10 with a run current so as to cause continued rotation of the rotor 14.

Because the regenerated current level in the phase winding 1 was very low to begin with (because the commutation current was off immediately before, during and after alignment of the rotor poles with the stator poles), and because the rotor 14 is nearing the end of decreasing inductance in the phase winding 1 when the limited current is introduced, the regenerated current in the phase winding 1 quickly goes to zero after turning off the transistors after the break away point. This substantially reduces any problems with braking or with torque ripple.

With the above description, a control designer with experience designing controls for switch reluctance motors can implement the commutation engine, the switch controllers and the position indicator, using a microprocessor and a field programmable gate array, with it associated components, in a conventional manner. In other embodiments, other devices could also be used.

Other features and advantages of the invention are set forth in the following claims.

We claim:

1. A switched reluctance motor providing rotor position detection without a separate rotor shaft position sensor, said motor comprising:

a stator having at least three circumferentially spaced stator pole pairs and at least three electrically isolated coils wound around said respective stator pole pairs to form three electrically independent stator phases, at least one of said stator poles having a pole face;

a rotor mounted for rotation within said stator and about a motor shaft axis and comprising a central hub having a plurality of circumferentially spaced rotor poles extending radially outwardly from said hub, at least one of said rotor poles having a rotor face so that, during rotor rotation, said rotor pole face is opposite said stator pole face of one of said phases, and, as rotation continues, the amount of said one rotor pole face opposite said one stator pole face decreases until where said one rotor pole face eventually moves away from said one stator pole face, the point where this occurs being referred to as the break away point;

an energy source;

a plurality of swatches, each of which is connected between one of each of said phases and said energy source, said switches being selectively operable to electrically connect said energy source to and disconnect said energy source from said phases, at least one of said switches being in said one phase;

energizing means, including switch operation means connected to said switches, for selectively energizing and deenergizing said phases in succession, based on rotor position information, to generate a torque on said rotor and thereby rotate said rotor, said energizing means causing at least said one phase to be energized and then deenergized to near a zero current level prior to said break away point, limited current turn on means connected to said switch operating means for operating said switch on said one phase to permit flow of limited current through said one phase after it reaches the near zero current level but before said break away point;

circuit means connected to said one phase for permitting said limited current to circulate through said one phase; and current sensing means for sensing the amount of current in said one phase and for determining when said current exceeds a predetermined regenerative current threshold at about said break away point, said energizing means being connected to said current sensing means to use this excess regenerative current information at about the break away point for rotor position information.

2. A switched reluctance motor as set forth in claim 1 wherein said motor includes a field programmable gate array.

3. A switched reluctance motor as set forth in claim 1 wherein said switches are insulated gate bipolar transistors connected between said phases and said energy source.

4. A switched reluctance motor as set forth in claim 1 wherein said limited current turn on means chops said switch to permit limited current flow through said one phase.

5. A switched reluctance motor as set forth in claim 1 wherein said circuit means includes a diode connected to at least one of said switches and to said immediately previously energized phase so as to provide a regenerated current reluctance through said immediately previously energized phase.

6. A switched reluctance motor as set forth in claim 1 wherein said energizing means causes said one phase to be deenergized to near a zero current level immediately after alignment of said one rotor pole with said one stator pole.

7. A switched reluctance motor as set forth in claim 1 wherein said limited current turn on means permits flow of limited current through said one phase at about 15 degrees past alignment of said one rotor with said one stator.

8. A switched reluctance motor as set forth in claim 1 wherein each of said rotor poles has a pole face and wherein each of said stator poles has a pole face.

9. A switched reluctance motor as set forth in claim 1 wherein said break away point is at about 30 degrees past alignment of said one rotor with said one stator.

10. A switched reluctance motor providing rotor position detection without a separate rotor shaft position sensor, said motor comprising:

a stator having at least three circumferentially spaced stator pole pairs and at least three electrically isolated coils wound around said respective stator pole pairs to form three electrically independent stator phases;

a rotor mounted for rotation within said stator and about a motor shaft axis and comprising a central hub having a plurality of circumferentially spaced rotor poles extending radially outwardly from said hub;

an energy source having a positive supply voltage and a negative supply voltage;

a plurality of switches, each of which is connected between one of each of said phases and said energy source, adjacent phases being alternately connected between said positive supply voltage and said negative supply voltage, said switches being selectively operable to electrically connect said energy source to and disconnect said energy source from said phases;

energizing means, including switch operation means connected to said switches, for selectively energizing and deenergizing said phases in succession, based on rotor position information, to generate a torque on said rotor and thereby rotate said rotor, and current sensing means for sensing the amount of current in said each of said phases, said energizing means being connected to said current sensing means to use current information for rotor position information.

11. A switched reluctance motor providing rotor position detection without a rotor shaft position sensor, said motor comprising:

a rotor mounted for rotation about a rotor shaft axis and including a central hub having a plurality of circumferentially spaced rotor poles extending radially outwardly from said hub;

a stator surrounding said rotor and having at least three circumferentially spaced stator poles and at least three electrically isolated coils wound around said respective stator poles to form three electrically independent stator phases;

an electrical energy source, and energizing means for selectively energizing said phases in succession with a run current to generate a torque on said rotor and thereby rotate said rotor, said energizing means including:

a plurality of phase switches connected between said phases and said energy source for selectively electrically connecting said energy source to said phases, switch operating means connected to said switches for selectively operating said switches, current sensing means for sensing the amount of current in each of said phases, first means using said sensed current for determining rotor position at low motor speeds, second means using said sensed current for determining rotor position at higher motor speeds, and run means connected to said first and second means and said switch operating means for switching on a selected one of said switches to rotate said rotor.

* * * * *